United States Patent [19]
Cook

[11] Patent Number: 5,379,147
[45] Date of Patent: Jan. 3, 1995

[54] DYE LASER AMPLIFIERS

[75] Inventor: Gary Cook, Worcestershire, England

[73] Assignee: The Secretary of State for Defence in Her Britannic Majesty's Government of the United Kingdom and Northern Ireland, United Kingdom

[21] Appl. No.: 960,386

[22] PCT Filed: Mar. 9, 1992

[86] PCT No.: PCT/GB92/00410
§ 371 Date: Jan. 11, 1993
§ 102(e) Date: Jan. 11, 1993

[87] PCT Pub. No.: WO92/16038
PCT Pub. Date: Sep. 17, 1992

[30] Foreign Application Priority Data

Mar. 11, 1991 [GB] United Kingdom ............. 9105058.3

[51] Int. Cl.$^6$ ............................ H01S 3/08; H01S 3/23; G02F 1/35
[52] U.S. Cl. ................................. 359/334; 359/300; 359/338
[58] Field of Search ............... 359/334, 338, 300, 244, 359/342; 372/3, 21, 33, 53

[56] References Cited

U.S. PATENT DOCUMENTS 3,469,107 9/1969 Townes et asl. .................... 359/334
3,986,140 10/1976 Angadiyavar et al. .............. 359/342
4,739,507 4/1988 Byer et al. ........................... 359/334

OTHER PUBLICATIONS

Bourne et al, Rev. Sci. Inst., vol. 56, #9, Sep. 1985, pp. 1736-1739.
Atnanspacher et al; Phys. Rev. A (USA), vol. 35, #1, pp. 142-153, Jan. 1, 1987.
Chertkov, A. A., Opt. Spertrose, (USA), vol. 66, #5, pp. 666-669, May 1989.
Case et al; Optics Communications, vol. 69, pp. 3-4, Jan, 1, 1989.
Case et al., Optics Communications, vol. 69, No. 3,4; Jan. 1, 1989; "A Flashlamp-Pumped Dye Laser With a SBS Phase-Conjugate Resonator".

Primary Examiner—Nelson Moskowitz
Attorney, Agent, or Firm—Nixon & Vanderhye

[57] ABSTRACT

A dye laser amplifier is formed by a stimulated brillouin scattering (SBS) dye cell which receives both dye laser light to be amplified and a pump beam along a common optical path. Phase conjugation and amplification of received energy are reflected from the SBS cell. The cell comprises an SBS medium that is a solvent for the laser dye used. Typical SBS mediums are methanol, acetone, isopropyl alcohol, etc. Typical dyes are Rhodamine 6G, Rhodamine B, Rhodamine 560, Rhodamine 575, Sulphorhodamine B, Kiton Red, DCM, Courrarun 523, etc. A plurality of amplifiers may be connected in series to provide increased amplification. The action of the phase conjugation corrects optical distorsions, thereby preserving beam quality and bandwidth even after multiple amplifications. A typical dye laser beam of 590 nm wavelength, about 1 µJ may be amplified to about 120 mJ, with a 17 nsec pulse width, and <500 MHz bandwidth.

11 Claims, 3 Drawing Sheets

DYE LASER AMPLIFIERS

BACKGROUND OF THE INVENTION

1. Field of the Invention

This invention relates to dye laser amplifiers.

2. Discussion of Prior Art

Dye lasers are a known type of laser in which a dye cell pumped with energy causes a laser action from the cell. The dye cell is a vessel containing a gaseous liquid or solid dye and is often arranged between reflectors forming a laser cavity. An advantage of dye lasers is that their frequency can be readily changed. For example one of the cavity reflectors may be a reflective grating. Varying the angle of this grating to the cavity varies the dye laser output frequency. Output power is a function of pumping power. The limit of output power is reached when the the pumping power is sufficient to cause a total population inversion the dye and the optical design of the laser allows all of the stored energy to be extracted from the dye. Large output powers may be achieved by increasing the size of the laser, but this is often not desirable. Instead a relatively lower power laser may be used and its output amplified.

Laser amplifiers are useful because they allow the maximum optical extraction to be achieved from a laser medium. A normal laser requires feedback in order to sustain the laser oscillations. The feedback is usually provided with partially reflective mirrors and it is only the transmitted portion of the beam that forms the laser beam that emerges from the device. No matter how low the reflectivity of the exit mirror becomes, the output beam can never be 100% since some portion is required to provide the feedback. A laser amplifier has no mirrors to provide a transmission loss, but instead relies on there being a laser beam present from another laser. Providing that this beam is intense enough, it can cause all of the amplifer energy to be extracted.

Laser amplifiers are also useful in other areas; for instance, if a high power laser is required to be built using some components which are sensitive to laser damage, then a low power laser can be designed and then amplified without affecting the original beam qualities. In this way the sensitive optical components are not exposed to damaging power levels.

There are many sorts of amplifiers that are currently used in conjunction with dye lasers but the two most used employ dye as the the gain medium. These amplifiers are flashlamp pumped and laser pumped. Additionally, laser pumping may be either transverse in geometry (pumping beams is at some angle, usually 90°, to the extracted dye laser beams) or longitudinal in geometry (pumping beam is coaxial to the extracted dye laser beams).

A disadvantage of using amplifiers is added system complexity, i.e. additional optics, dye cells and support mounts.

Both dye lasers and amplifiers are described for example in Dye Lasers, edited by F. P. Schäffer, second edition, published by Springer-Verlag, 1977.

One problem with existing amplifiers is that they amplify or broaden the bandwidth, i.e. the output consists of a wider range of frequencies Typically a single longitudinal mode (SLM) dye laser has a bandwidth of less than 1 GHz and after amplification it increases to much greater than 1 GHz. It is highly desirable to amplify the output of a dye laser and maintain a narrow bandwidth.

As used in this specification the term light includes electromagnetic radiation in the visible, infra red, ultra violet, and nearby wavelengths.

SUMMARY OF THE INVENTION

According to this invention a dye laser amplifier incorporates a stimulated brillouin scattering (SBS) medium with a laser dye; this improves bandwidth, beam uniformity, and allows a plurality of amplifiers to be cascaded to provide a very high degree of amplification with a few components and hence improved reliability and ruggedness.

According to this invention a dye laser amplifier comprises a dye cell, means for supplying a dye laser beam to be amplified, means for supplying a pumping beam, and means for directing an amplified dye laser beam from the amplifier, Characterised by:
  a stimulated brillouin scattering (SBS) dye cell, comprising a laser dye material dissolved in a SBS medium contained between two cell walls,
  means for directing the dye laser beam into the SBS cell, and
  means for directing the pump beam into the SBS cell.

The dye laser beam and pump beam may be arranged to enter the SBS cell coaxially. Alternatively, the pump beam may enter the SBS cell transversely to the dye laser beam. The pump beam may be a beam from a laser or flashlamp pump.

According to a further aspect of this invention output from the amplifier may be used as the dye laser beam input to a further dye laser amplifier.

In this manner two or more amplifiers may be arranged in series to progressively amplify the original dye laser beam. A large amount of amplification can be achieved because the laser amplifier automatically corrects for distortions which are produced in laser dye medium when pumped by strong pump beams. Strong pump beams are necessary in order to maximise the optical gain within the dye medium.

The SBS medium is chosen to be a solvent for the particular laser dye. For example the SBS medium may be methanol, acetone, isopropyl alcohol, etc. either alone or as a mixture. One specific example of a SBS mixture is 20% methanol, 70% n-hexane, and 10% isopropyl alcohol. The relative amounts of the components may be varied.

The SBS medium may also be in gaseous or solid form. A suitable gas is a heated dye vapour and methane. A suitable solid is an amorphous solid e.g. solgel or polymethylmethacrylate (PMMA) containing the laser dye.

The terms stimulated brillouin scattering and phase conjugate reflection are described for example in Nonlinear Optical Phase Conjugation, by D. M. Pepper, Optical Engineering, March/April 1982, vol 21, no 2 pages 156–182.

BRIEF DESCRIPTION OF THE DRAWINGS

The invention will now be described by way of example only with reference to the accompanying drawings of which.

DETAILED DISCUSSION OF PREFERRED EMBODIMENTS

Figure 1:
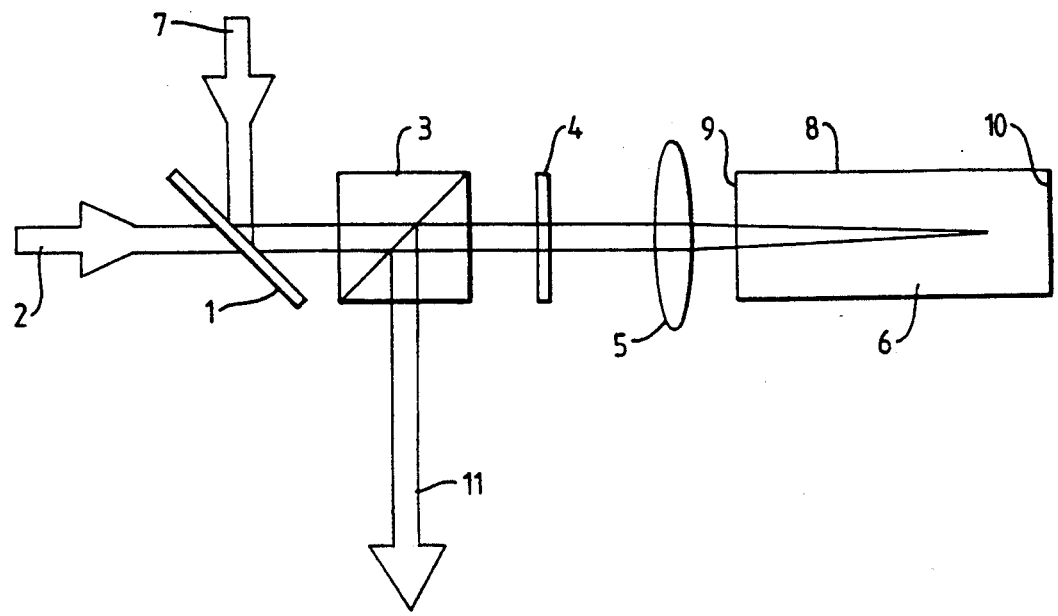
FIG. 1 is a diagrammatic view of an SBS dye laser amplifier.

As shown in FIG. 1 a dye laser amplifier comprises a dichroic mirror 1 through which a dye laser beam 2 passes via a polarising beam splitter 3, a quarter wave plate plate 4, lens 5, on it way to a stimulated brillouin scattering (SBS) dye cell 6. A pump laser beam 7 is incident on the mirror 1 and is reflected coaxially with the dye laser beam 2 into the SBS cell 6. The mirror 1 is made to reflect at the pump laser beam wavelength. The polariser 3 transmits linear polarised light of say vertical polarisation, and reflects horizontally polarised light. The quarter wavelength plate 4 converts linear polarised light to circularly polarised light and visa versa. The lens 5 focusses light to a point within the cell 6.

This cell 6 is typically a tube 8 with a glass front face 9 and a glass rear face 10. In one cell the walls were 2 mm thick, the front and rear faces 9, 10 were 22 mm diameter and 1.5 mm thick, with a spacing between faces 9, 10 of 100 mm. The faces 9, 10 may be normal to the beams 2, 7, or at an angle suitable to prevent unwanted reflections being superimposed onto the amplified beam. Inside the cell 6 is a laser dye material disolved in a mixture of 20% methanol, 70% n-hexane, and 10% isopropyl alcohol. Suitable dyes are, e.g. Rhodamine 6G, Rhodamine B, Coumarin 523, etc., typically mixed in the proportion of 10 mg dye: 1 liter solute. This proportion varies according to the dye and solvent used, and the input pump power density. Advantageously dye is flowed through the cell 6 or the dye in the cell is stirred.

The cell 6 is a SBS medium, it produces a phase conjugate beam i.e. an input beam with optical distortions will be returned with those distortions temporally reversed. Thus any optical distortions in the dye beam 2, pump beam 7, plus any introduced by the mirror 1, polariser 3, quarter wave plate 4, lens 5 and the front face 9 will be reversed so that the polariser and reflector 3 will receive from the cell 6 an optically corrected and amplified beam. Details and an explanation of phase conjugate reflection are given in Nonlianear Optical Phase Conjugation, by D. M. Pepper, Optical Engineering, March/April 1982, vol 21, No 2, pages 156–182.

The dye laser beam 2 is typically of 570 nm wavelength, 40 µJ energy in an 18 nsec pulse, and has a near transform limited bandwidth of about 64 MHz.

The pump laser beam 7 is typically of 532 nm wavelength, 13.5 mJ energy in a 20 nsec pulse, either a single longitudinal mode (SLM) or broadband laser. The output bandwidth of an amplified dye laser will be slightly narrower if a SLM pump is used due to the absence of modulation broadening arising from pump mode beating.

In operation a vertically polarised dye laser beam 2 passes through the mirror 1 and polarising beam splitter 3. The quarter waveplate 4 converts the beams to circular polarisation and then lens focusses into the cell 6. Likewise the pump beam 7 is reflected off the mirror 1 and is focussed into the cell 6. The focussing of the two beams 2, 7 concentrates their energy causing inversion and laser amplification of the laser dye in the cell 6. Since the gain is available in both directions within the cell 6 a weak dye laser beam which would normally be below the SBS threshold intensity can now be phase conjugated by virtue of the forward amplification. Increasing the power density increases the lasing intensity.

Due to the narrow linewidth requirements of the SBS process, amplified spontaneous emission, which is broad band, is not reflected. This allows the dye laser beam to be effectively amplified without gaining broad band noise, which is a severe limitation of conventional dye laser amplifiers. Some laser energy is released forwards to exit through the rear cell wall 10, but more importantly a phase conjugated beam will be emitted from the from the SBS due cell 6 towards the polarising beam splitter 3, and reflect off the beam splitter 3 to form the output beam 11. Amplification of the dye laser beam 2 can occur in both directions of travel within the SBS dye cell 6, i.e. the dye laser beam 2 can be amplified in its original form and as a phase conjugate.

In one example a dye laser beam of 66 w power and 64 MHz bandwidth was amplified to 155 kW with a bandwidth of 64 MHz in a single amplifier as shown in FIG. 1, an equivalent energy gain of 2350 times.

Due to the ability of the amplifier to amplify without gaining broad band noise, it can be cascaded with further amplifiers to obtain large amounts of gain. Additionally, the SBS process also acts to limit the bandwidth of the amplified conjugate, thereby limiting the increase in bandwidth associated with non-noise related broadening mechanisms.

Figure 2:
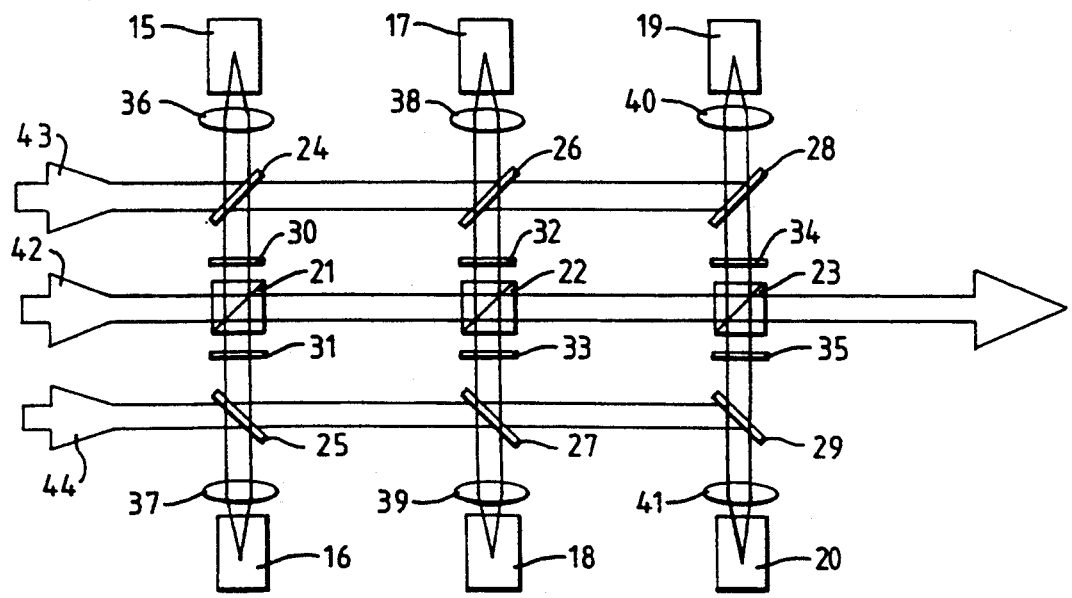
FIG. 2 is a diagrammatic view of six of the SBS amplifiers of FIG. 1 connected together in series to increase the amount of amplification.

This is shown diagrammatically in FIG. 2 where six amplifiers are cascaded to make a "daisy chain" amplifier. This amplifier comprises sic SBS cells 15, 16, 17, 18, 19, 20; three polarising beam splitters 21, 22, 23; six dichroic mirrors 24, 25, 26, 27, 28, 29; six quarter waveplates 30, 31, 32, 33, 34, 35; six lenses 36, 37, 38, 39, 40, 41; a dye beam 42; and two pump beams 43, 44 all arranged as shown. Each component is as in FIG. 1.

Operation is as follows. A portion of the dye laser beam 42 is reflected by the beam splitter 21 and into the dye cell 15 where it is joined by the pump beam 43 after reflection from the dichroic mirror 24. Amplified dye laser light from the cell 15 forms the dye laser input to the cell 16 which receives pump beam 44 reflected from the dichroic mirror 25. Amplified (by two times) output from the cell 16 is reflected by the beam splitter 21 to form a dye beam for further amplification.

Similarly the twice amplified dye beam 42 passes from the beam splitter 21 via the beam splitter 22 and into the cell 17. A portion of the pump beam 43 passes through the dichroic mirror 24 and is reflected by mirror 26 into the cell 17. Amplified dye laser light from cell 17 is directed into the cell 18 where it meets a portion of pump beam 44 transmitted through the mirror 25 and reflected off mirror 27. Four times amplified dye beam light exits from the cell 18 to be reflected off the beam splitter 22 to form the input to the last two ampliers.

The dye beam 42 (now amplified four times) passes from the beam splitter 22 and is reflected from the beam splitter 23 into the cell 19. A portion of the pump beam 43 passes through the dichroic mirrors 24, 26 and is reflected by mirror 28 into the cell 19. Amplified dye laser light from cell 19 is directed into the cell 20 where it meets a portion of pump beam 44 transmitted through mirrors 25, 27 and reflected off mirror 29. Six times amplified light exits from the cell 18 to be reflected off the beam splitter 22 to form the finally amplified beam 45.

Further SBS cell pairs and associated optical components may be added to give further amplification.

Figure 3:
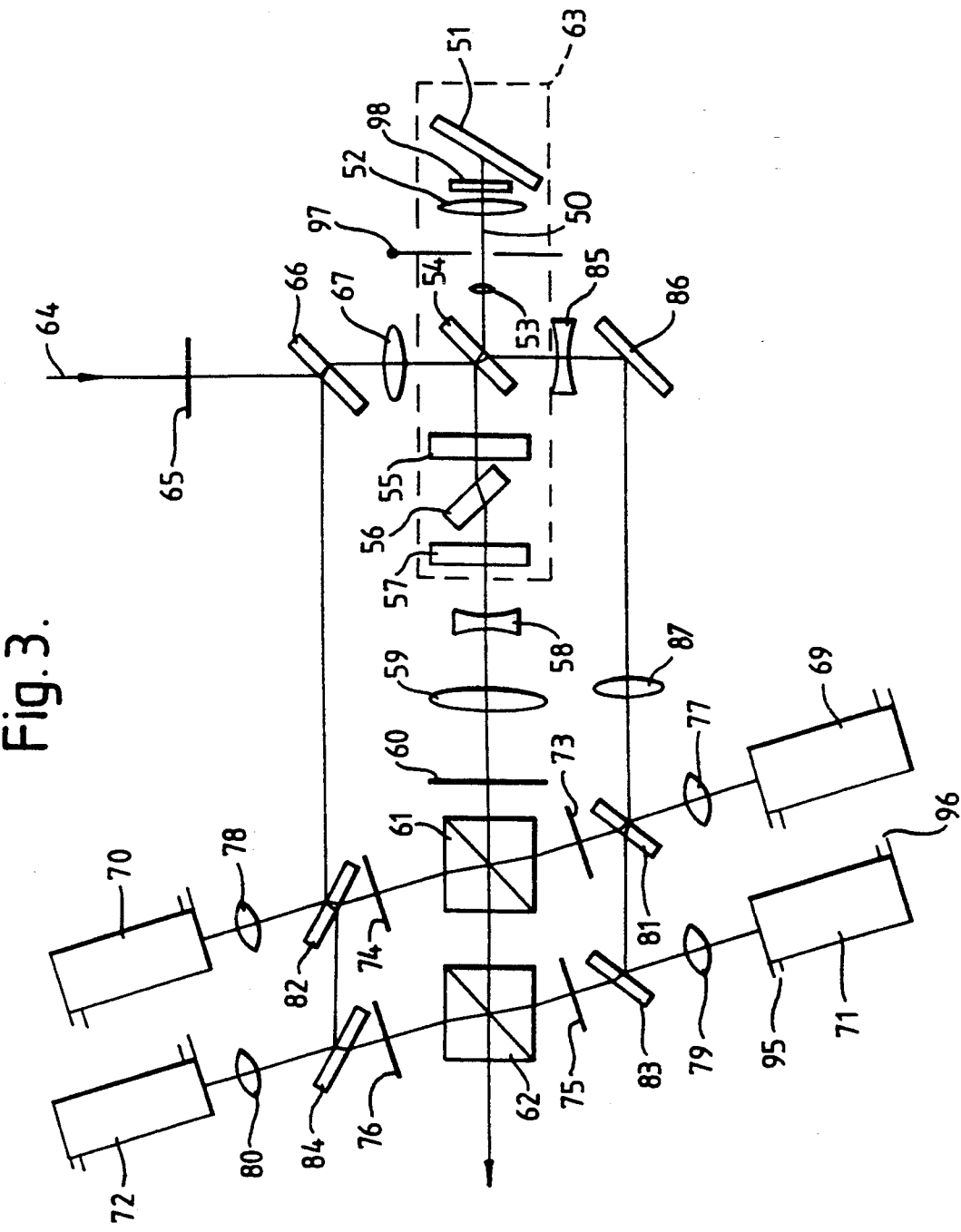
FIG. 3 is a schematic block diagram showing an arrangement of optical components in a dye laser plus four amplifier embodiment.

FIG. 3 is a schematic block diagram showing arrangement of optical components in a dye laser and four amplifier embodiment. As shown there is an optical path 50 along which lie the following components in serial order: a reflection grating 51, a positive lens 52, a negative lens 53, a dichroic beam splitter 54, a first coupling mirror 55, an oscillator dye cell 56, a second coupling mirror 57, a negative lens 58, a positive lens 59, a half wave plate 60, a first polarising beam splitter 61, and a second polarising beam splitter 62.

The positive lens 52 and negative lens 53 act to provide a beam expanding telescope to give a high magnification in order to maximise the resolving power of the reflection grating 51 which is used as a tuning element. Additional improvements may be achieved by a pin hole aperture 97 arranged between the two lenses 52, 53, and by insertion of a low finesse etalon 98 between the lens 52 and grating 51.

The dye cell 56 may be formed by e.g. Rhodamine B dye in methanol at a concentration of about $1.3 \times 10^{-4}$ Molar. The cell walls may be 1 mm thick fused quartz plates spaced about 5 mm apart, and the whole cell tilted at about 20° to reduce unwanted feedback. Other suitable dyes are Rhodamine 6G. Sulphorhodamine B, Kiton red, Rhodamine 575, Rhodamine 560, DCM, etc. The cell 56 may be 7 mm×7 mm×32mm high×1 mm thick fused quartz material. Both the top and bottom of the dye cell have a 10 mm long 5 mm outside diameter glass tube 95, 96 onto which a flexible pipe is fitted to flow dye through the cell.

A dye laser 63 is formed by the components between the reflection grating 51 the first coupling mirror 55 and the second coupling mirror 57 which define a resonantly reflecting laser cavity. Energy for this dye laser 63 is from a laser pump beam 64 through a half wave plate 65, a beam splitter 66, and positive lens 67 onto the dichroic beam splitter 54. Part of the pump energy incident on this dichroic beam splitter 54 is reflected off into the dye cell where lasing of dye occurs. Dye cell 56 light output oscillates between the first and second coupling mirrors 56, 57, and reflection grating 51 at a wavelength dependent upon the, adjustable, angle of the grating 51.

Four dye laser amplifiers are constructed as in FIG. 1. Each comprise a SBS dye cell 69, 70, 71, 72 with associated quarter wave plate 73, 74, 75, 76, positive lens 77, 78, 79, 80. Additionally cells 69, 70 are associated with dichroic beam splitters 81, 82, and cells 71, 72 are associated with dichroic mirrors 83, 84. Further components are a negative lens 85, mirror 86, and positive lens 87 all of which receive a portion of pump beam 64 transmitted through the dichroic beam splitter 54.

The dye cells 69, 70, 71, 72 are fused quartz flow-through cuvettes, 22 mm diameter, 103 mm long, fitted with a flexible flow tube of 6 mm diameter at each end on the top of the cuvette.

Details of other components are as follows: The reflection grating 51 may be a holographic type with 2400 lines per mm, blazed for 590 nm, 30 mm×30 mm×6 mm thick and used at first order in a Littrow TM mount; described by T. W. Hansch, Applied Optics, vol 11, 1972, page 895. Positive lens 52, +150 mm focal length plano-convex, anti reflection coated for 590 nm, 15 mm diameter. Positive lens 53, acting as a high power microscope objective lens, 4 mm focal length, working distance=0.8 mm, numerical aperture=0.5. Dichroic beam splitter 54, 94% transmission at 532 nm, 100% transmission at 590 nm 45° incidence, P-polarisation, 15 mm diameter, positioned at 45° to the two optic axes with the front face centred on the intersection of the two optic axes. Coupling mirrors 55, 57, one face uncoated giving a reflectivity of about 4–6%, the other anti reflection coated, 0.5° wedged coupling mirrors, 15 mm diameter 10 mm thick. Negative lens 58 −10 mm focal length, plano-concave lens, anti reflection coated for 590 nm, 3 mm diameter. Positive lens 59, +50 mm or +51 mm focal length, bi-convex lens, anti reflection coated for 590 nm, 15 mm diameter.

Half wave plates 60, 65 zero order, anti reflection coated for 590 nm, 15 mm diameter 2-3 mm thick. Polarisers 61, 62 air spaced calcite Glan-Taylor cube polariser, anti reflection coated for 590 nm, 10 mm×10 mm×12 mm (xyz) cemented into an optical mount. Beam splitter 66, 65% reflection at 532 nm, 45° angle of incidence, 25 mm diameter, 6 mm thick. Positive lens 67, +100 mm focal length plano-convex lens, anti reflection coated for 532 nm, 15 mm diameter. Quarter wave plates 73, 74, 75, 76, zero order, anti reflection coated for 590 nm, 15 mm diameter, 2-3 mm thick. Positive lenses 77, 78, 79, 80, either +100 mm or +80 mm focal length plano-convex or bi-convex lens, anti reflection coated for 590 nm, 15 mm diameter.

Dichroic beam splitter 81, 20% reflection at 532 nm, anti reflection coated at 590 nm, 54° angles of incidence with respect to the surface of the component (i.e. 72° between the incident and relected beams), 25 mm diameter, 6 mm thick. Dichroic beam splitter 82, 20% reflection at 532 nm, anti reflection coated at 590 nm, 364° angles of incidence with respect to the surface of the component (i.e. 108° between the incident and relected beams), 25 mm diameter, 6 mm thick. Dichroic mirror 83, 100% reflection at 532 nm, anti reflection coated at 590 nm, 54° angle of incidence with respect to the surface of the component (i.e. 72° between the incident and reflected beams), 25 mm diameter, 6 mm thick. Dichroic mirror 84, 100 % reflection at 532 nm, anti reflection coated at 590 nm, 36° angle of incidence with respect to the surface of the component (i.e. 108° between the incident and reflected beams), 25 mm diameter, 6 mm thick. Negative lens 85, −40 mm focal length bi-convex lens, anti reflection coated for 532 nm, Mirror 86, 100% reflectance at 532 nm, 45° incidence, 25 mm diameter. Positive lens 87, +200 mm focal length plano-convex lens, anti reflectance coated for 532 nm, 25 mm diameter, 2 mm edge thickness.

Operation to generate and amplify a dye laser beam is as follows. The pump beam 64 is generated by a second harmonic from a Nd:YAG laser, or similar laser (not shown) to give a beam of light typically at 532 nm, 250 mJ, 20 nsec duration. A portion, about 2.1%, of this pump beam 64 is transmitted through the beam splitters 66, 54 into the dye laser 63 and into the dye cell 56 causing a lasing action. Typically the dye laser light is at 590 nm. Typically about 65% and 29% remainder of the pump beam 64 energy is reflected off each of the beam splitter 66 and mirror 86 respectively to form pump energy for the amplifiers.

Output from the dye laser 63 is via the lenses 58, 59, half wave plate 60, first polarising beam splitter 61 and then into the SBS dye cell 69. Simultaneously a portion, about 20%, of the remaining pump beam 64 energy from the mirror 86 is reflected by the dichroic beam splitter 81 into the SBS cell 69. As described above with reference to FIG. 1, amplified dye laser light is emitted back from the SBS cell 69 and is directed via the dichroic beam splitter 81, quarter wave plate 73, polarising beam splitter 61, quarter wave plate 74, and dichroic beam splitter 82 into the SBS cell 70. Pump beam energy for the SBS cell 70 is from the beam splitter 66 and dichroic beam splitter 82.

Twice amplified dye laser beam is directed from the SBS cell 70 via dichroic beam splitter 82, quarter wave plate 74, polarising beam splitters 61, 62, quarter wave plate 75, and dichroic mirror 83 into the SBS cell 71. Pump energy for this SBS cell 83 is from the dichroic beam splitter 81 and dichroic mirror 83. Amplified, three times, dye laser light is directed from the SBS cell 71 via dichroic mirror 83, quarter wave plate 75, polarising beam splitter 62, quarter wave plate 76, and dichroic mirror 84 into the SBS cell 72. Pump beam energy for this SBS cell 72 is from the dichroic beam splitter 82 and dichroic mirror 84. Amplified, four times, dye laser light is directed from the SBS cell 72 via the dichroic mirror 84, quarter wave plate 76, and polarising beam splitter 62 along the optical path 50 to form the finally amplified dye laser beam.

Typically this finally amplified dye laser beam is 120 mJ in 17 nsec pulse width, $\leq 64$ MHz bandwidth, approximately transform limited.

Further amplification may be achieved using additional SBS cells.

An advantage of the arrangement shown in FIG. 3 is the relatively few components used to provide generation and a four stage amplification of a variable wavelength dye laser beam; e.g. a 120,000 times amplification, from about 1 $\mu$J to 120 mJ. In one known prior art laser amplifier (Versatile high power single longitudinal mode pulsed dye laser, F Bos, Applied Optics, vol 20, No 10, pages 1886–1890, May 15, 1981), only 114 times amplification was achieved with a similar number of components. The reduced number of components used in the present invention provides a system that is relatively easy to set up and align, and once aligned is robust and insensitive to vibration.

Figure 4:
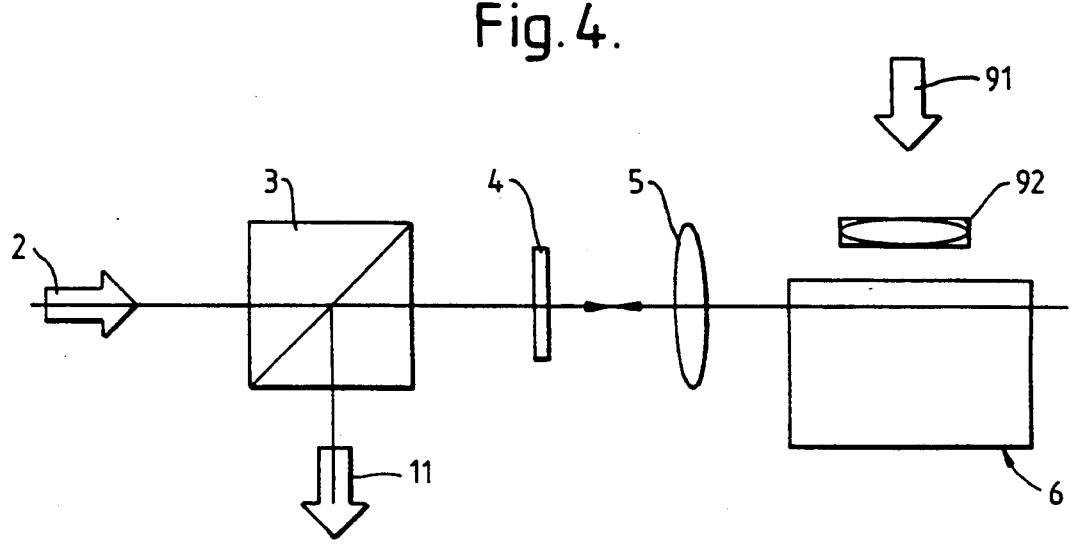
FIGS. 4, 5 are modifications of FIG. 1 with different pump arrangements.

FIG. 4 is a modification of FIG. 1 where a pump beam 91 enters a dye cell 6 transversely through a cylindrical lens 92. As in FIG. 1 a dye laser beam 2 passes through a polarising beam splitter 3, a quarter wave plate 4, a lens 5 and into an SBS dye cell 6. This cell 6 is moved from that of FIG. 1 so that the beam 2 enters off axis to allow maximum volume for inter-action with the pump beam.

Figure 5:
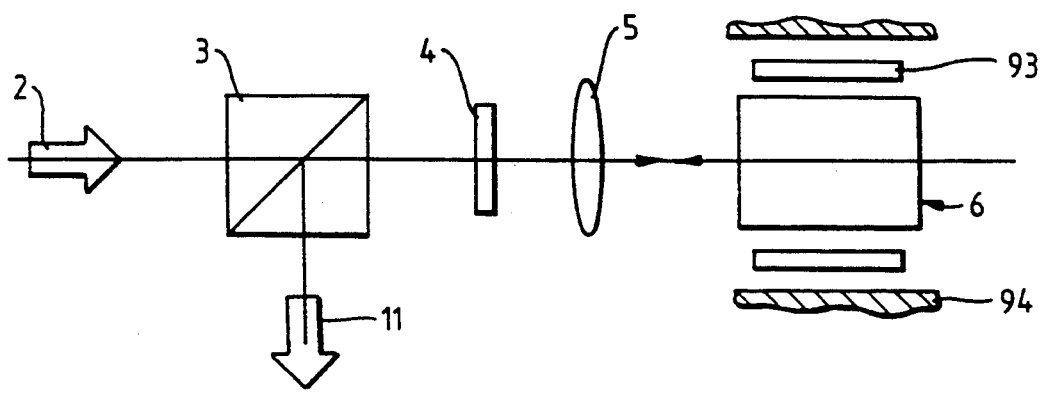

FIG. 5 is another modification of FIG. 1 where a pump beam, is provided by a flash lamp source 93 surrounded by reflector 94. Other components are as FIG. 4. The cell 6 is arranged co-axially with the dye laser beam 2. The flashlamp 93 may be linear tubes, coaxial i.e. an annular surrounding the cell 6 with or without triaxial or quadaxial adaptations, or helical. Flash lamp pulses are short, typically around 1 $\mu$s.

I claim:

1. A dye laser amplifier comprising:
   a dye cell,
   means for supplying a laser beam to be amplified,
   means for supplying a pumping beam, said dye cell comprising a stimulated brillouin scattering (SBS) dye cell including a laser dye material dissolved in an SBS medium contained between two cell walls,
   means for directing and focusing the laser beam into the SBS dye cell, said laser beam directing and focusing means and said dye cell comprising a phase conjugation reflector,
   means for directing the pump beam into the SBS dye cell, and
   means for directing an amplified laser beam from the SBS dye cell.

2. The amplifier of claim 1 wherein the means for directing and focusing the laser beam and the means for directing the pump beam comprise a means for directing the laser beam and pump beam to enter the SBS dye cell coaxially.

3. The amplifier of claim 1 wherein the means for directing the pump beam comprises a means for directing the pump beam in the SBS dye cell transversely to the laser beam.

4. The amplifier of claim 1 wherein the pump beam is a beam from a laser.

5. The amplifier of claim 1 wherein the pump beam is a beam from a flashlamp pump.

6. The amplifier of claim 1 comprising a plurality of dye laser amplifiers cascaded together so that the output of a first amplifier is used as the laser beam input to the following dye laser amplifier.

7. The amplifier of claim 1 wherein the means for supplying a laser beam to be amplified and the means for supplying a pumping beam are separate lasers.

8. The amplifier of claim 1 wherein the means for supplying a laser beam to be amplified is provided by a dye laser pumped by a laser that is also the means for supplying a pumping beam.

9. The amplifier of claim 1 wherein the SBS cell comprises a SBS medium that is a solvent for the laser dye material.

10. The amplifier of claim 5 wherein the SBS medium is one selected from one or more of:
    methanol, acetone, isopropyl alcohol, ethanol, n-hexane.

11. The amplifier of claim 6 wherein the SBS medium is a mixture of 15–25% of methanol, 65–75% of n-hexane, and 5–15% of isopropyl mixed to give substantially 100% mixture of methanol, n-hexane, and isopropyl.

* * * * *